(12) United States Patent
Abel et al.

(10) Patent No.: US 8,165,253 B2
(45) Date of Patent: Apr. 24, 2012

(54) METHODS AND APPARATUS FOR SERIALIZER/DESERIALIZER TRANSMITTER SYNCHRONIZATION

(75) Inventors: Christopher J. Abel, Coplay, PA (US); Vladimir Sindalovsky, Perkasie, PA (US); Lane A. Smith, Easton, PA (US)

(73) Assignee: Agere Systems Inc., Allentown, PA (US)

( * ) Notice: Subject to any disclaimer, the term of this patent is extended or adjusted under 35 U.S.C. 154(b) by 862 days.

(21) Appl. No.: 12/200,106

(22) Filed: Aug. 28, 2008

(65) Prior Publication Data

US 2010/0054386 A1    Mar. 4, 2010

(51) Int. Cl.
*H04L 7/00* (2006.01)
(52) U.S. Cl. ......... 375/354; 714/707; 714/708; 370/324
(58) Field of Classification Search .................. 375/354, 375/360, 368, 369, 212, 214, 215; 714/707, 714/708; 327/141, 142, 143, 144, 150, 159; 370/503, 324
See application file for complete search history.

(56) References Cited

U.S. PATENT DOCUMENTS

| | | | |
|---|---|---|---|
| 6,823,224 B2* | 11/2004 | Wood et al. | 700/87 |
| 2003/0002539 A1* | 1/2003 | Soda et al. | 370/509 |
| 2004/0001565 A1* | 1/2004 | Jones et al. | 375/354 |
| 2005/0257002 A1* | 11/2005 | Nguyen | 711/114 |

* cited by examiner

*Primary Examiner* — Dac Ha
(74) *Attorney, Agent, or Firm* — Ryan, Mason & Lewis, LLP

(57) ABSTRACT

Methods and apparatus are provided for serializer/deserializer transmitter synchronization. A plurality of channels are synchronized in one or more serializer/deserializer devices by generating a synchronization request in one or more of the channels; generating an enable signal in response to the synchronization request; and generating a gated synchronization signal for only one or more periods of a synchronization signal in response to the enable signal. The gated synchronization signal can optionally be deasserted after the one or more periods of a synchronization signal.

20 Claims, 4 Drawing Sheets

METHODS AND APPARATUS FOR SERIALIZER/DESERIALIZER TRANSMITTER SYNCHRONIZATION

FIELD OF THE INVENTION

The present invention relates generally to transmitter synchronization techniques, and more particularly, to transmitter synchronization techniques for multi-channel communications.

BACKGROUND OF THE INVENTION

FIG. 1 is a schematic block diagram of an exemplary conventional serializer/deserializer (SerDes) communication "macrocell" 100 (often referred to as a "macro"). As shown in FIG. 1, the exemplary SerDes communication macrocell 100 typically comprises multiple channels (Channel 0, Channel 1, ..., Channel P). Typically, each channel performs its own CDR function. A phase locked loop (PLL) 102 provides a reference clock, such as a bit rate clock, 104 that is used by each channel to synchronize transmissions, in a known manner. Individual SerDes channels (Channel 0 ... Channel P) can be combined together to provide a multiple channel configuration, often referred to as a communication pipe, in a known manner. In a multiple channel configuration, parallel data should be serialized using serializers 110-0 through 110-P in such a manner that the corresponding serial streams have a limited skew (typically on the order of 1.25 unit intervals (UI)). The serial data rate and the number of channels used as one pipe may change dynamically. The individual channels must be synchronized with the other channels used within the same communication pipe. In addition, the number of channels may span across several SerDes macros 100, but still must be synchronized.

A number of techniques have been proposed or suggested for synchronizing individual channels in a multi-channel configuration of a SerDes macrocell. For example, one known technique employs a constantly running synchronization pulse (usually at the byte rate clock) to synchronize individual channels. This technique, however, consumes significant power due to the distribution of the synchronization signal through multiple channels. In addition, this technique requires a precise timing relation between the synchronization pulse and the higher rate bit clock. If this timing relation changes significantly, an error in the serial bit stream can be introduced.

Another technique for synchronizing individual channels employs a synchronous release of a reset with the bit rate clock stopped and resumed after the reset is released. This "synchronous reset" method cannot be used when a number of channels are added on-the-fly because the channels currently in use will experience interruption in their transmit functionality. When multiple SerDes macros are used within the same pipe, a synchronous reset has to be distributed between the macros with one macro designated as a master device and the remaining macros serving as slave devices. When one of the SerDes macros is designated as a master device, however, this particular macro cannot be powered down.

A need therefore exists for improved methods and apparatus for multiple channel synchronization in SerDes macrocells.

SUMMARY OF THE INVENTION

Generally, methods and apparatus are provided for serializer/deserializer transmitter synchronization. According to one aspect of the invention, a plurality of channels are synchronized in one or more serializer/deserializer devices by generating a synchronization request in one or more of the channels; generating an enable signal in response to the synchronization request; and generating a gated synchronization signal for only one or more periods of a synchronization signal in response to the enable signal. The gated synchronization signal can optionally be deasserted after the one or more periods of a synchronization signal.

The gated synchronization signal is a non-continuous signal and is generated for a limited duration. In addition, the gated synchronization signal synchronizes only the one or more channels that request the synchronization. For example, the gated synchronization signal can be enabled in a given channel only if the given channel has requested the synchronization. The channels can request synchronization, for example, upon a power up or a change in data rate.

A more complete understanding of the present invention, as well as further features and advantages of the present invention, will be obtained by reference to the following detailed description and drawings.

DETAILED DESCRIPTION

The present invention provides improved methods and apparatus for multiple channel synchronization in one or more SerDes macrocells. According to one aspect of the invention, the disclosed multiple channel synchronization technique, referred to herein as a "one shot synchronization" technique, is based on a byte rate clock from a phase locked loop (PLL) and is performed when new channels join a new or existing pipe or when the data rate of a given pipe changes.

Synchronization Pulse Technique

Figure 1:
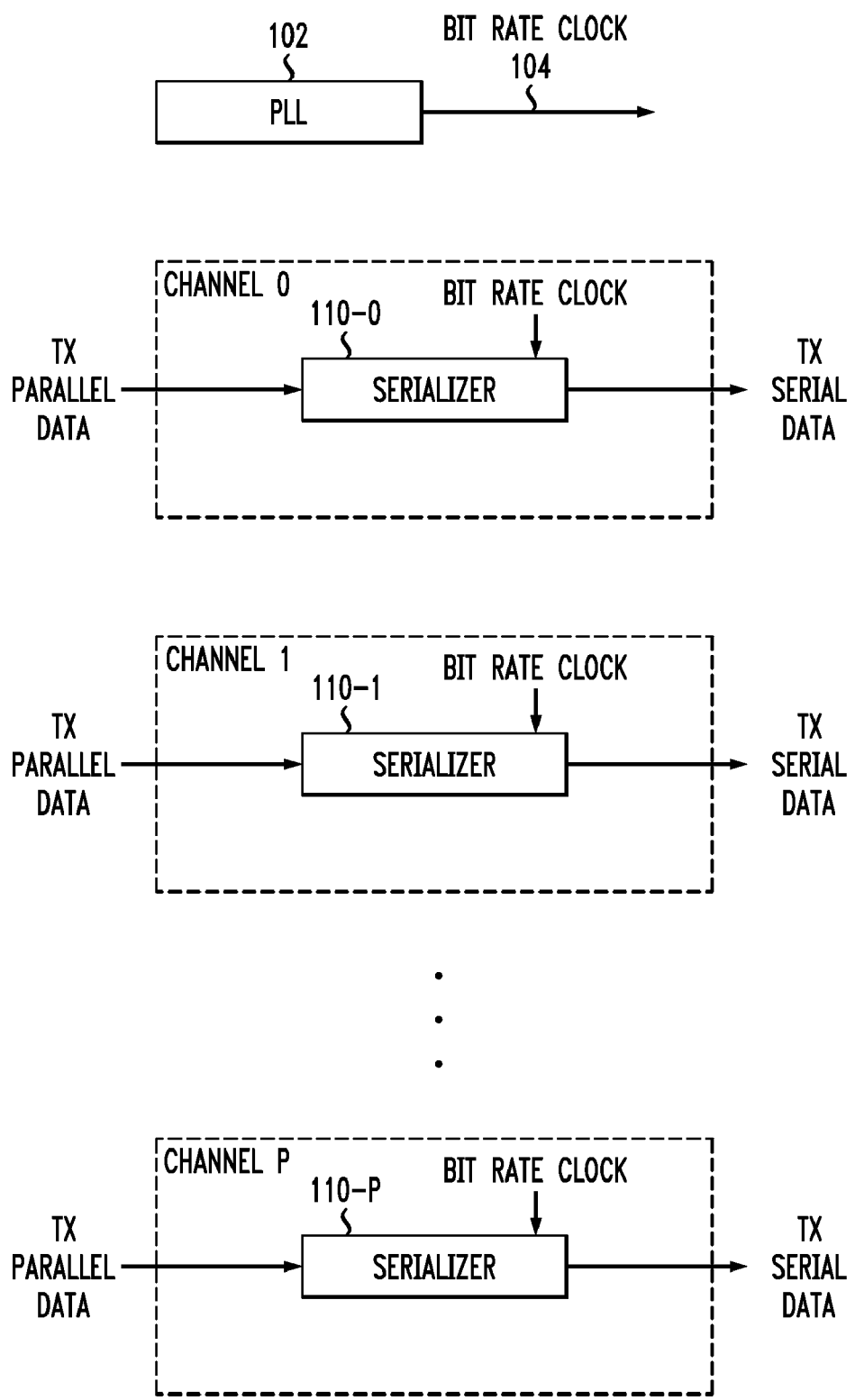
FIG. 1 is a schematic block diagram of an exemplary conventional SerDes "macro cell"
Figure 2:
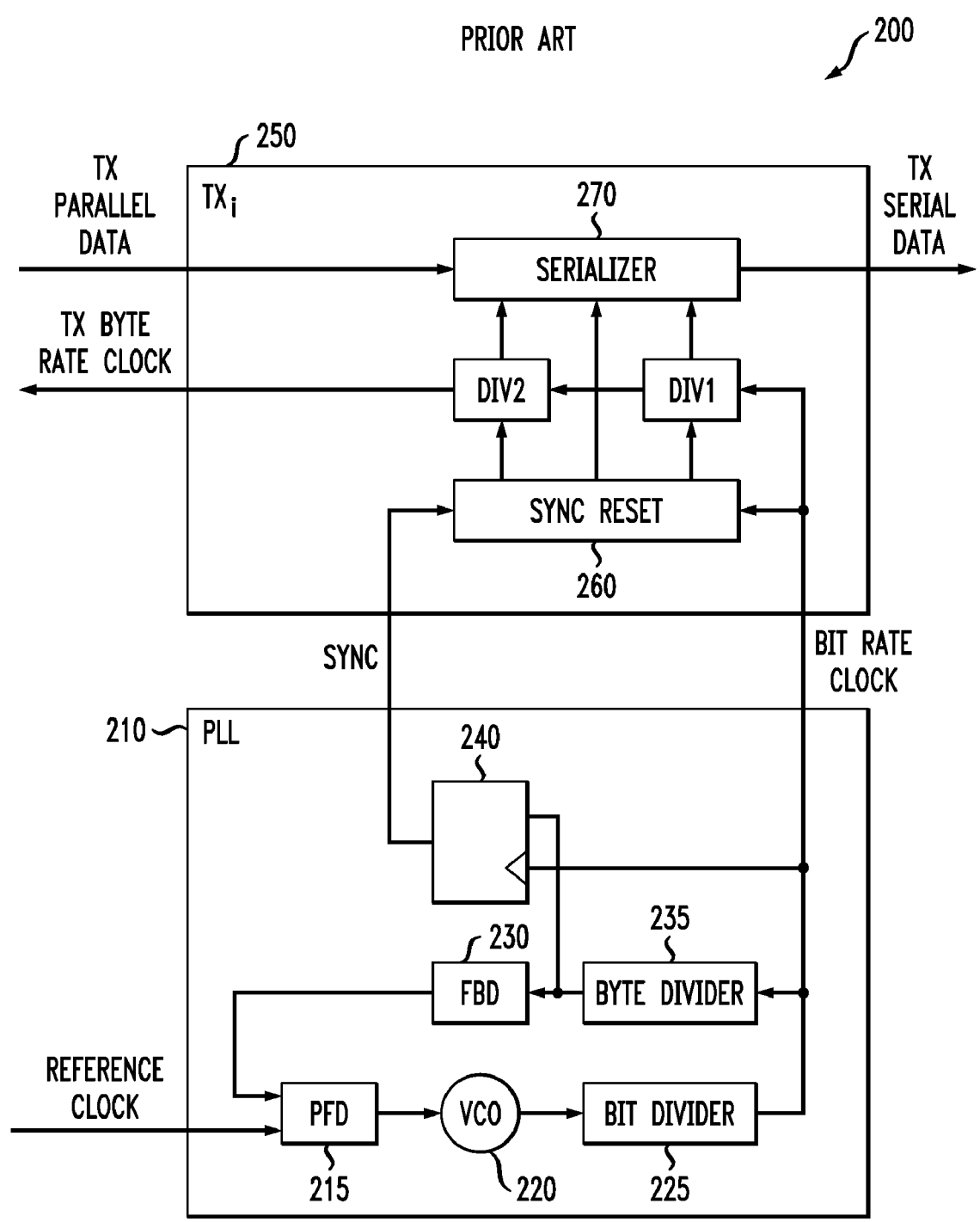
FIG. 2 is a schematic block diagram of an individual SerDes macrocell that employs a conventional synchronization technique based on a constantly running synchronization pulse.

FIG. 2 is a schematic block diagram of an individual SerDes macrocell 200 that employs a conventional synchronization technique based on a constantly running synchronization pulse. As shown in FIG. 2, a PLL 210 generates a repeatable synchronization event. Generally, the frequency of this synchronization event typically corresponds to the lowest frequency used in each transmitter channel. If the divider for lowest frequency is synchronized in different channels the higher frequencies will be phase aligned as well. This lowest frequency usually corresponds to a parallel data byte clock.

As indicated above, the conventional synchronization technique is based on a byte rate clock from a PLL 210. As shown in FIG. 2, the PLL 210 is comprised of a voltage controlled oscillator (VCO) 220 generating high frequency signal under control of a phase and frequency detector (PFD) 215. The output frequency of VCO 220 is divided down by bit divider 225 to a frequency rate corresponding to 1 or 2 Unit Intervals (UI), to generate a Bit Rate Clock. This frequency is distributed to all of the transmit channels, TXi, in a given macrocell 200 in order to generate TX Serial Data.

The Bit Rate Clock is also applied to a byte rate divider 235. The output of byte rate divider 235 in the PLL 210 is a Byte Rate Clock synchronized to the Bit Rate Clock by a latch 240. The Byte Rate Clock is distributed to all of the TX channels, TXi, as a Synchronization Pulse "sync". The output of byte rate divider 235 is further divided down by a feedback divider (FBD) 230 to the rate of the applied Reference Clock. The PFD 215 compares the phase and frequency of the output of FBD 230 with respect to the Reference Clock and controls the frequency of the VCO 220 such that the two frequencies and phases are aligned. The feedback loop ensures that the Byte and Bit Rate Clocks in different SerDes macros, such as macro 200, connected to the same Reference Clock are aligned (i.e., have the same frequency and phase).

As shown in FIG. 2, the transmitter channel TXi 250 receives the Bit Rate Clock and divides the Bit Rate Clock down using, for example, two dividers Div1 and Div2, in order to get clocks ranging from the Bit Rate Clock down to the Byte Rate Clock. The various clocks are used to latch and serialize incoming TX Parallel Data into TX Serial Data using a serializer 270. In order to align serial data from different TX channels 250 all of the dividers Div1 and Div2 are synchronously reset by a Sync Reset circuit 260 that is initialized continuously by the Synchronization Pulse. The rate of Byte Rate Clock in the transmitter is the same as Synchronization pulse rate. Thus, the synchronous reset can normally change the state of dividers only during the first synchronization after power up or data rate change. The consecutive synchronous resets confirm the phase of each divider in the TX channel 250.

As previously indicated, the distribution of the Synchronization pulse is power consuming. In addition, any change in the relationship of the Synchronization pulse with respect to the Bit Rate Clock will cause a phase change for the dividers in the TX channel 250, and hence create errors in the TX Serial data.

Synchronous Reset Technique

Figure 3:
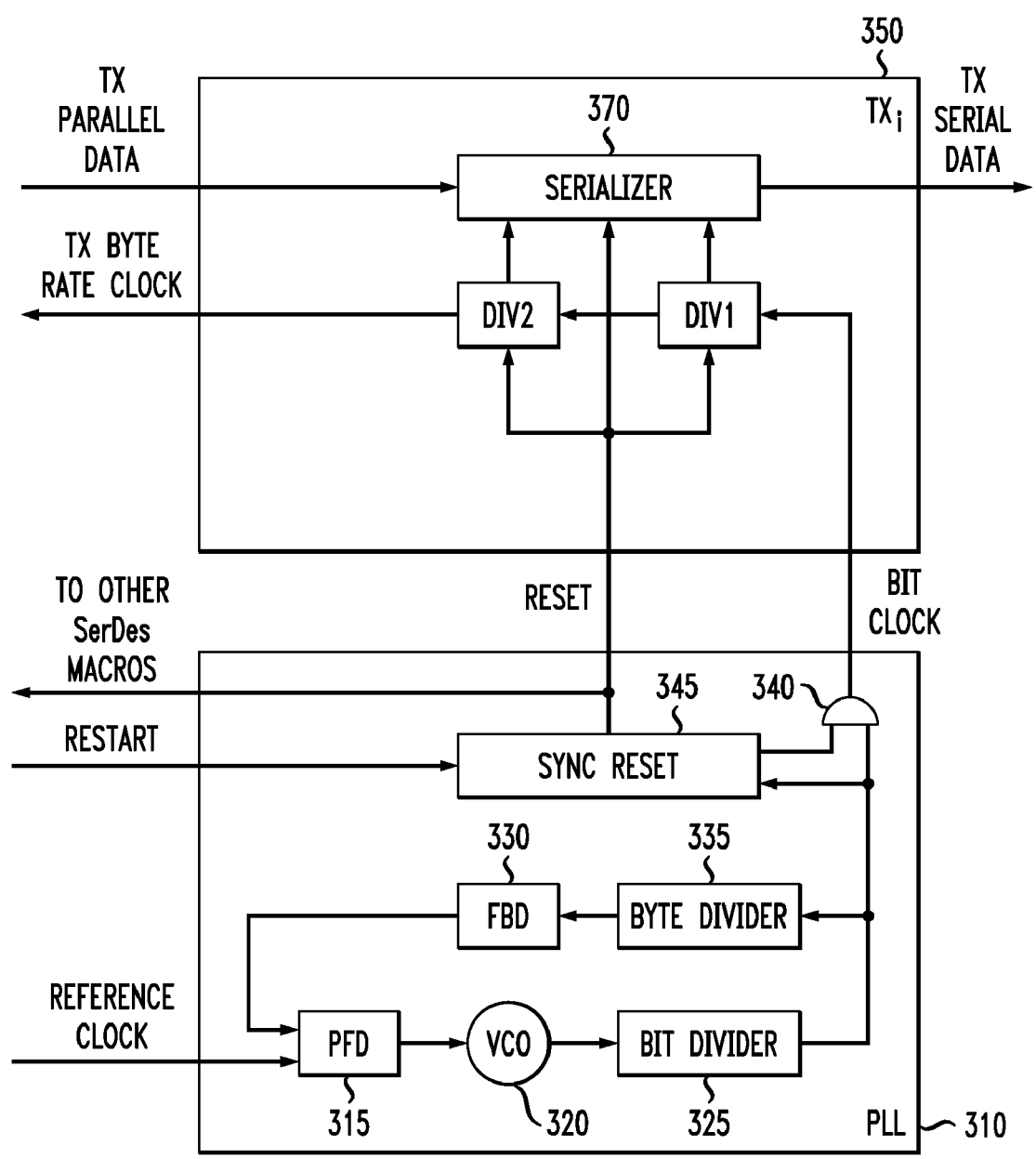
FIG. 3 is a schematic block diagram of an individual SerDes macrocell that employs a conventional synchronization technique based on a synchronous reset.

FIG. 3 is a schematic block diagram of an individual SerDes macrocell 300 that employs a conventional synchronization technique based on a synchronous reset. The conventional synchronous reset technique employs a byte rate clock from a PLL 310. As shown in FIG. 3, the PLL 310 is comprised of a PFD 315, a VCO 320, a bit divider 325, a FBD 330 and a byte rate divider 335 that operate in a similar manner to the corresponding elements of FIG. 2.

The synchronous reset method requests a restart upon a powering up of one or more channels in a pipe or upon a change in the data rate. Generally, a Sync Reset block 345 in the PLL 310 stops the Bit Rate Clock using an AND gate 340 and issues a Reset to all of the TX channels (only one channel is shown in FIG. 3). The clock stoppage and subsequent release are synchronous to the Bit Rate Clock, so clock gating is glitch free.

As shown in FIG. 3 for one channel 350, the Reset is applied to all of the clock dividers, such as DIV1 and DIV2, in the TX channels, forcing them to the same state. When the Reset is released, and after some delay, the Bit Rate Clock resumes. This sequence ensures that the TX serializers of all channels will be in phase, thereby ensuring a low skew of the serial channels.

If multiple SerDes macros, such as macro 300, are to be synchronized, the synchronous reset signal must be distributed from one macro (designated as a master device) to all of the other macros (designated as slave devices). The slave devices use the Reset signal from the master device in order to shut down and release the Bit Rate Clock to the associated TX channels.

One of the disadvantages of the synchronous reset method is the necessity to designate one macro 300 as a master device, making it impossible to power down the PLL 310 in the master macro device 300. In addition, the synchronous reset method is disruptive to running channels, so any power up or data rate change in any of the channels causes a stoppage in the serial transmission for all of the TX channels.

One Shot Synchronization Technique

Figure 4:
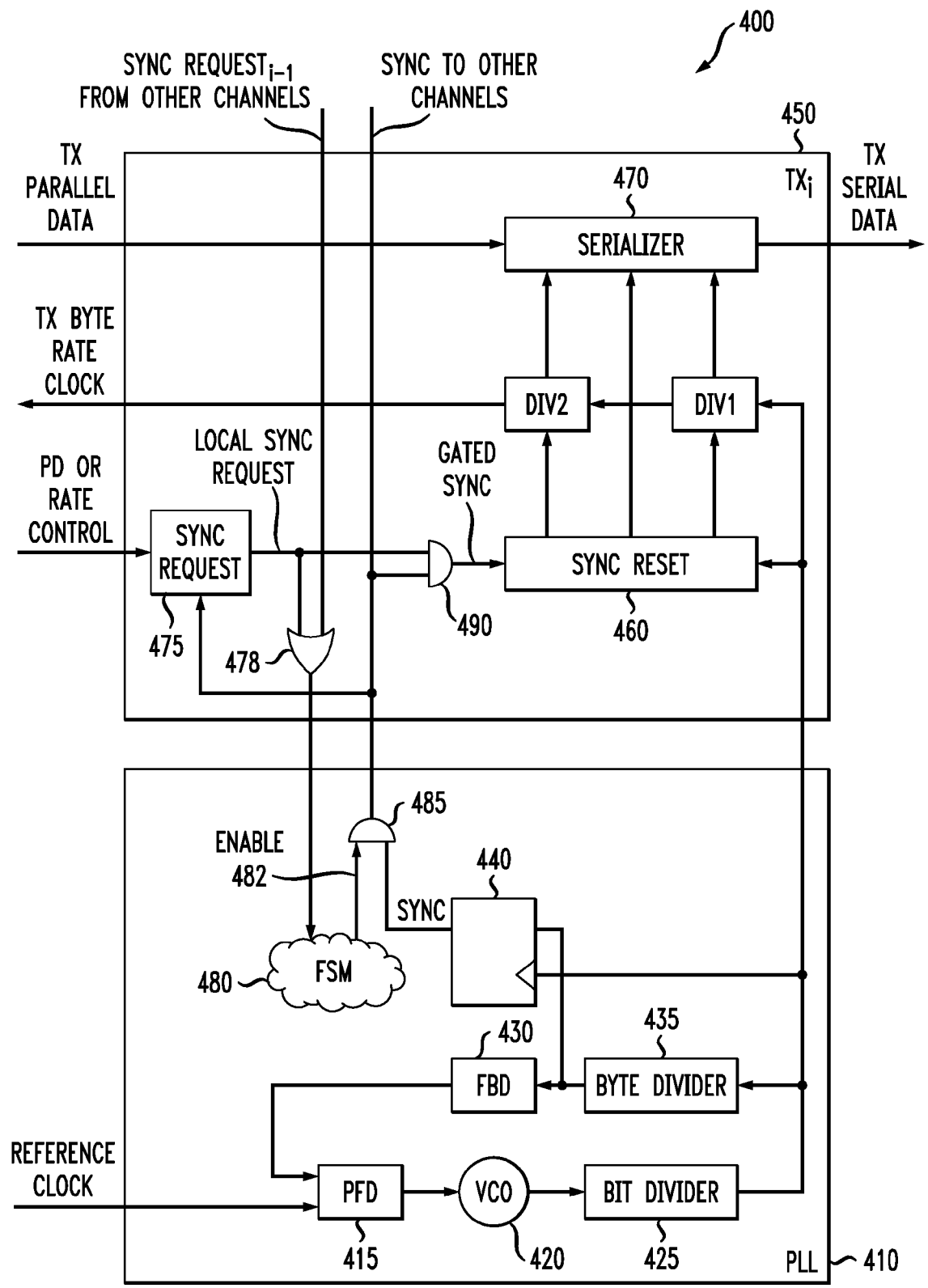
FIG. 4 is a schematic block diagram of an individual SerDes macrocell that employs a "one shot synchronization" technique in accordance with the present invention.

FIG. 4 is a schematic block diagram of an individual SerDes macrocell 400 that employs a "one shot synchronization" technique in accordance with the present invention. The disclosed "one shot synchronization" technique is based on a byte rate clock from a PLL 410. As shown in FIG. 4, the PLL 410 is comprised of a PFD 415, a VCO 420, a bit divider 425, a FBD 430, a byte rate divider 435 and a latch 440 that operate in a similar manner to the corresponding elements of FIG. 2.

As shown in FIG. 4, the transmitter channel TXi 450 receives the Bit Rate Clock and divides the Bit Rate Clock down using, for example, two dividers Div1 and Div2, in order to get clocks ranging from, for example, the Bit Rate Clock down to the Byte Rate Clock. The various clocks are used to latch and serialize incoming TX Parallel Data into TX Serial Data using a serializer 470. In order to align serial data from different TX channels 450 all of the dividers, such as dividers Div1 and Div2, are synchronously reset by a Sync Reset circuit 460 that is initialized by a "one shot synchronization" in accordance with the present invention using a gated sync signal, discussed further below.

According to one aspect of the invention, synchronization is requested each time a TX channel is powered up (PD) or the data rate (Rate Control) of the channel changes. In the exemplary embodiment, a Sync Request block 475 monitors the PD and Rate Control signals to detect a power up or rate change, respectively, and then requests synchronization by generating a Sync Request signal. The Local Sync Request signal from the local TX channel 450 (TXi) and sync request signals (sync request$_{i-1}$) from other channels are applied to an OR gate 478. The output of the OR gate 478 is applied to a finite state machine (FSM) 480 in PLL 410. Thus, a sync request from any channel will cause the output of the OR gate 478 to be high, and thereby trigger the FSM 480 in the exemplary embodiment.

In response to a received sync request, the FSM 480 generates an enable signal 482 for one time synchronization in accordance with the present invention. The enable signal 482 is applied to an AND gate 485, together with the sync signal generated by the latch 440, so that the sync signal is only generated at the output of the AND gate 485 when the enable signal 482 is present. The signal at the output of gate 485 can be sent to all of the TX channels, as shown in FIG. 4.

The output of the AND gate 485 is applied to a second AND gate 490 in each channel, together with the Local Sync Request signal generated by sync requester 475. In this manner, only channels that have an active Local Sync Request (i.e., those channels that were powered up or experienced a rate change) will allow synchronization of the dividers Div1, Div2 and Serializer 470.

After the one time synchronization is performed, the TX channels with an active Local Sync Request will disable the Local Sync Request signal, and the Gated Sync signal from gate 490 will be disabled. For example, the Sync Request block 475 can monitor the output of gate 485 and deassert the Local Sync Request after a predefined interval. In this manner, the Gated Sync signal is a non-continuous signal, resulting in power savings relative to the conventional techniques described above. As a result, the newly powered up (or Data rate switched) channels will be synchronized to the already running channels. Among other benefits of the embodiment of FIG. 4, the "sync" signal is a part of the PLL loop and thus has a constant timing relation to the Bit Clock. In addition, the disclosed "one shot synchronization" technique allows any number of TX channels to be added on-the-fly, synchronizing them to already running channels, with substantially no disruption. In addition, a long time drift of sync signals in respect to the bit clock will not cause an error, since the sync signals are not used continuously.

CONCLUSION

While exemplary embodiments of the present invention have been described with respect to digital logic blocks, as would be apparent to one skilled in the art, various functions may be implemented in the digital domain as processing steps in a software program, in hardware by circuit elements or state machines, or in combination of both software and hardware. Such software may be employed in, for example, a digital signal processor, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

A plurality of identical die are typically formed in a repeated pattern on a surface of the wafer. Each die includes a device described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

It is to be understood that the embodiments and variations shown and described herein are merely illustrative of the principles of this invention and that various modifications may be implemented by those skilled in the art without departing from the scope and spirit of the invention.

We claim:

1. A method for synchronizing a plurality of channels in one or more serializer/deserializer devices, comprising:
   generating a synchronization request in one or more of said channels;
   generating an enable signal in response to said synchronization request; and
   generating a gated synchronization signal for only one or more periods of a synchronization signal in response to said enable signal.

2. The method of claim 1, further comprising the step of deasserting said gated synchronization signal after said one or more periods of a synchronization signal.

3. The method of claim 1, wherein said gated synchronization signal is a non-continuous signal.

4. The method of claim 1, wherein said gated synchronization signal synchronizes only said one or more channels that requested said synchronization.

5. The method of claim 4, wherein said one or more channels request said synchronization upon a power up or a change in data rate.

6. The method of claim 4, further comprising the step of enabling said gated synchronization signal in a given channel only if said given channel has requested said synchronization.

7. The method of claim 1, wherein said enable signal selectively enables said gated synchronization signal.

8. The method of claim 1, wherein said generating step generates said gated synchronization signal for a limited duration.

9. A serializer/deserializer device, comprising:
   a clock generator for generating a synchronization signal; and
   a plurality of communication channels that transmit serial data, wherein each of said channels comprise a synchronization circuit comprising:
   a sync request block for generating a synchronization request;
   a first logic circuit for generating an enable signal in response to said synchronization request; and
   a second logic circuit for generating, in response to said enable signal, a gated synchronization signal for only one or more periods of a synchronization signal.

10. The serializer/deserializer device of claim 9, wherein said second logic circuit deasserts said gated synchronization signal after said one or more periods of a synchronization signal.

11. The serializer/deserializer device of claim 9, wherein said gated synchronization signal is a non-continuous signal.

12. The serializer/deserializer device of claim 9, wherein said gated synchronization signal synchronizes only said one or more channels that requested said synchronization.

13. The serializer/deserializer device of claim 12, wherein said one or more channels request said synchronization upon a power up or a change in data rate.

14. The serializer/deserializer device of claim 12, further comprising the step of enabling said gated synchronization signal in a given channel only if said given channel has requested said synchronization.

15. The serializer/deserializer device of claim 9, wherein said enable signal selectively enables said gated synchronization signal.

16. The serializer/deserializer device of claim 9, wherein said second logic circuit generates said gated synchronization signal for a limited duration.

17. The serializer/deserializer device of claim 9, wherein said sync request block is embodied on an integrated circuit.

18. The serializer/deserializer device of claim 9, wherein said first logic circuit is an AND gate that receives a synchronization signal and a signal from a finite state machine.

19. The serializer/deserializer device of claim 9, wherein said second logic circuit is an AND gate that receives a synchronization request from a given channel.

20. The serializer/deserializer device of claim 9, wherein said clock generator is a phase locked loop circuit.

* * * * *